United States Patent
Satoh et al.

(10) Patent No.: US 7,095,424 B2
(45) Date of Patent: Aug. 22, 2006

(54) IMAGE DISPLAY APPARATUS AND METHOD, AND STORAGE MEDIUM

(75) Inventors: Kiyohide Satoh, Kanagawa (JP); Mahoro Anabuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 10/274,200

(22) Filed: Oct. 21, 2002

(65) Prior Publication Data

US 2003/0080979 A1    May 1, 2003

(30) Foreign Application Priority Data

Oct. 26, 2001   (JP)   ............... 2001-329361

(51) Int. Cl.
G09G 5/00       (2006.01)
G06K 9/32       (2006.01)

(52) U.S. Cl. ...................................... 345/633; 382/293
(58) Field of Classification Search ................ 345/633; 382/293, 295

See application file for complete search history.

(56) References Cited

U.S. PATENT DOCUMENTS 6,057,856 A * 5/2000 Miyashita et al. .......... 345/633
6,166,744 A * 12/2000 Jaszlics et al. ............. 345/629
2002/0140709 A1* 10/2002 Sauer et al. ................ 345/633

FOREIGN PATENT DOCUMENTS

JP        2001-50990       2/2001

* cited by examiner

Primary Examiner—Kee M. Tung
Assistant Examiner—Aaron M Richter
(74) Attorney, Agent, or Firm—Fitzpatrick, Cella, Harper & Scinto

(57) ABSTRACT

An image display apparatus calculating correction information to correct measured values of an orientation sensor includes an orientation sensor that senses orientation of a viewpoint and outputs measured values, a correction unit for correcting the measured values by using correction information, and a generation unit for generating a virtual image based on the corrected measured values. A display unit displays the generated virtual image, and a calculation unit calculates the corrected information. The calculation unit obtains the measured values of the sensor at the point of when the virtual image is displayed at an appropriate position, generates the correction information from the measured values and predetermined orientation information, and generates the virtual image based on orientation information relating to the viewpoint obtained using the measured values of the orientation sensor and the correction information.

8 Claims, 5 Drawing Sheets

IMAGE DISPLAY APPARATUS AND METHOD, AND STORAGE MEDIUM

BACKGROUND OF THE INVENTION

1. Field of the Invention

The present invention relates to an image display apparatus and method in which an image in a virtual space fused with a real space is displayed based on output values from a posture sensor. More particularly, the invention relates to an image display apparatus and method in which an image in a virtual space drawn in accordance with a posture of a viewpoint of an image pickup apparatus is superposed on an image in a real space photographed by the image pickup apparatus, and the superposed image is displayed on a display picture surface, an image display apparatus and method in which an image in a virtual space drawn in accordance with a posture of a viewpoint of a user is displayed on an optical see-through-type display picture surface through which a real space is transparently observable with the virtual image, and a storage medium.

2. Description of the Related Art

Recently, mixed reality (hereinafter abbreviated as "MR") aiming at seamless connection of a real space and a virtual space is intensively being studied. MR is obtained according to a video see-through method in which an image in a virtual image (such as a virtual object drawn according to computer graphics (hereinafter abbreviated as "CG"), character information or the like) is superposed on an image in a real space photographed by an image pickup apparatus, such as a video camera or the like, and the resultant image is displayed, or an optical see-through method in which an image in a virtual space is displayed on an optical see-through-type display picture surface of a display apparatus through which a real space is transparently observable with the virtual image.

It is being expected to apply such MR to new fields qualitatively different from conventional virtual reality, such as navigation in which, for example, the name and the guide of a building is superposed and displayed on a building in a real town, scenery simulation in which a CG image of a building to be built on a planned site is displayed in a superposed state, and the like. A common request for such applications is how exactly a real space and a virtual space are to be aligned, and many attempts have been done for this request.

The problem of alignment in MR according to the video see-through method relates to the problem of obtaining the three-dimensional position/posture of a viewpoint of an image pickup apparatus in a world coordinate system set in a real space (hereinafter simply termed a "world coordinate system"). The problem of alignment in MR according to the optical see-through method relates to the problem of obtaining the three-dimensional position/posture of a viewpoint of a user in the world coordinate system.

In order to solve such problems, acquisition of the three-dimensional position/posture of a viewpoint of a photographing apparatus or a user (hereinafter simply termed a "viewpoint") in the word coordinate system by utilizing a three-dimensional position/posture sensor, such as a magnetic sensor, an ultrasonic sensor or the like, has been generally practiced.

In situations in which fixed values may be used for the position of a viewpoint, for example, in a case in which the distance to an object is sufficiently large outdoors, acquisition of the three-dimensional position/posture of a viewpoint by obtaining the three-dimensional posture of the viewpoint using a three-dimensional posture sensor including a gyrosensor and an accelerometer has been generally practiced.

For example, when using a posture sensor TISS-5-40 made by Tokimec Kabushiki Kaisha as a three-dimensional posture sensor, output values from the sensor represent the sensor's three-dimensional posture in a sensor coordinate system in which a direction opposite to the direction of gravity is defined as the y axis, and the forward direction of the sensor on the x-z plane defined by the y axis when starting the sensor is defined as the -z axis. Accordingly, output values from a three-dimensional sensor do not generally represent the three-dimensional posture of a viewpoint in the world coordinate system to be measured. That is, output values from the sensor cannot be used for the three-dimensional posture of the viewpoint in the world coordinate system, and it is necessary to perform some coordinate transformation. More specifically, coordinate transformation in which the posture of a sensor is transformed into the posture of a viewpoint, and coordinate transformation in which a posture in the sensor coordinate system is transformed into a posture in the world coordinate system are required. In this specification, data for performing coordinate transformation between output values from a sensor and the three-dimensional posture of a viewpoint in the world coordinate system is termed "correction information".

Figure 1:
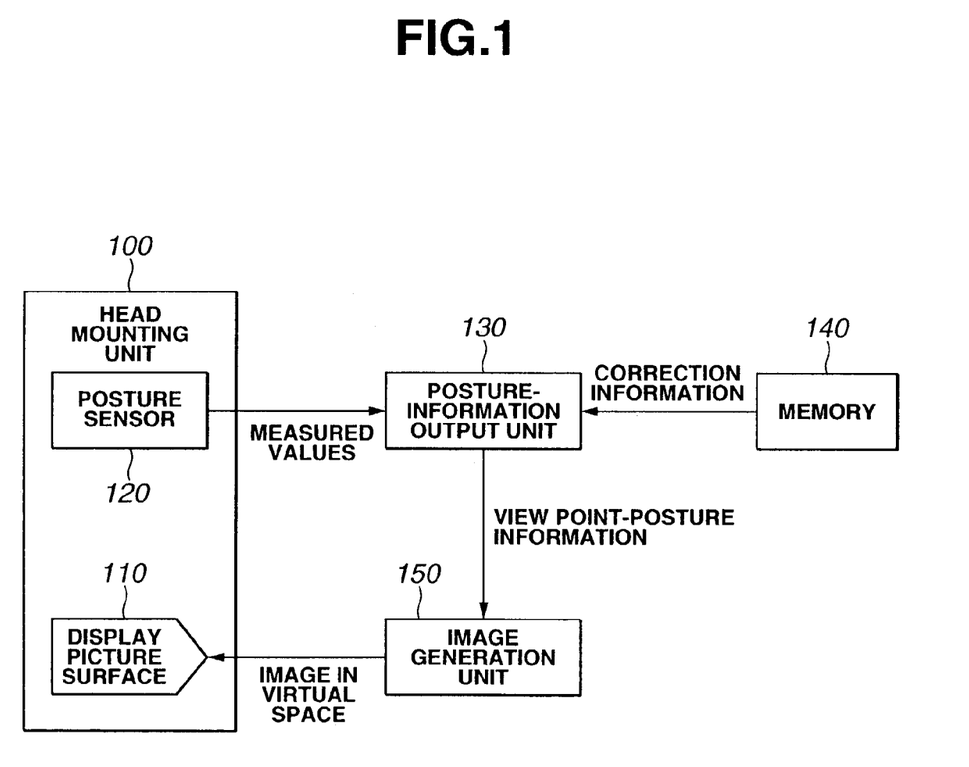
FIG. 1 is a block diagram illustrating the configuration of an ordinary image display apparatus that provides MR according to an optical see-through method.

FIG. 1 illustrates the configuration of an ordinary image display apparatus for providing MR according to the optical see-through method.

An optical see-through-type display picture surface 110 is fixed on a head mounting unit 100 together with a posture sensor 120. When a user (not shown) mounts the head mounting unit 100 so that the display picture surface 110 is positioned in front of the user's eyes, the user can observe a real space in front of the display picture surface 110 via an optical system (not shown in FIG. 1) of the display picture surface 110. The posture sensor 120 measures its posture in the sensor coordinate system, and outputs measured values of the posture having three degrees of freedom. The posture sensor 120 incorporates a tiltmeter (not shown) that can measure the direction of gravity of the earth. As described above, one axis (the y axis in this case) of the sensor coordinate system is set to a direction opposite to the direction of gravity.

A posture-information output unit 130 calculates the posture of the user' viewpoint in the word coordinate system by transforming measured values input from the posture sensor 120 in accordance with correction information stored in a memory 140, and outputs the calculated values as posture information. An image generation unit 150 generates and outputs a virtual image corresponding to the user's posture in accordance with the posture information input from the posture-information output unit 130. The display picture surface 110 inputs the virtual image from the image generation unit 150 and displays the input virtual image. According to the above-described configuration, the user sees the virtual image displayed on the display picture surface 110 which is fused with a view of the real space seen via the display picture surface 110.

Figure 2:
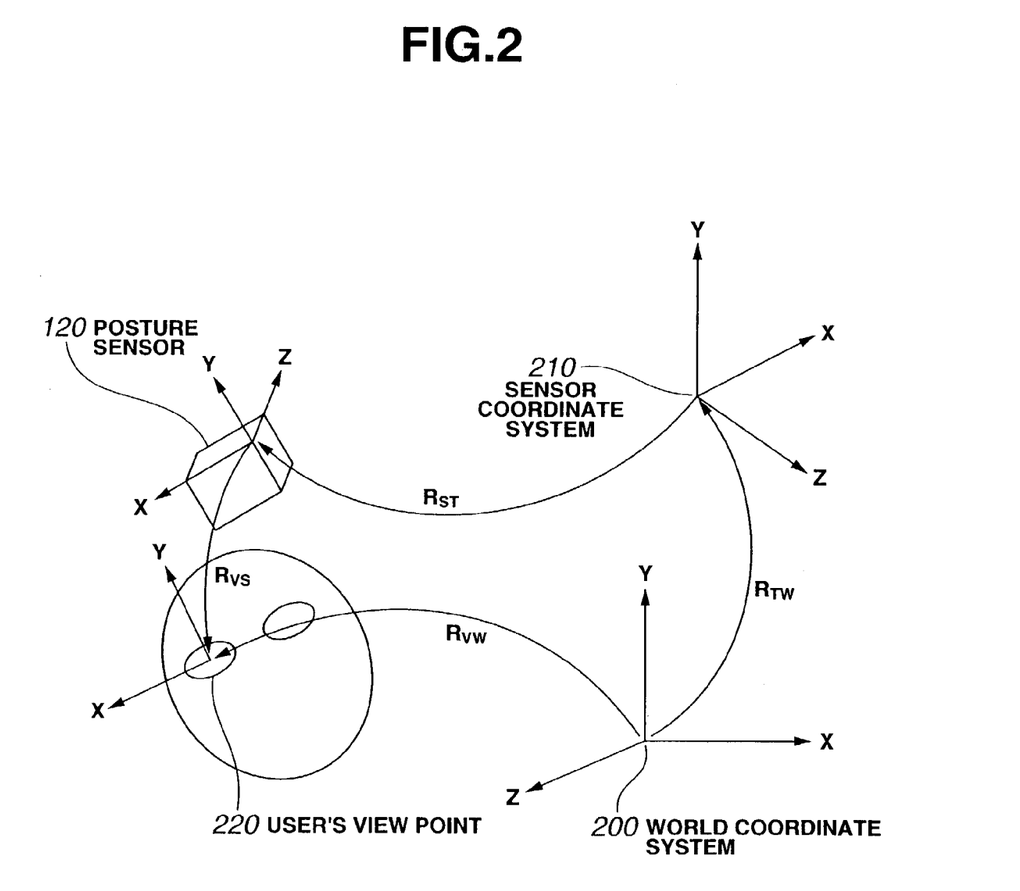
FIG. 2 is a diagram illustrating a method for calculating a posture of a user's viewpoint 220 in a world coordinate system 200.

Next, a description will be provided of a method for calculating the posture of the user's viewpoint in the world coordinate system by the posture-information output unit 130, with reference to FIG. 2.

In FIG. 2, the posture of a sensor coordinate system 210 in a world coordinate system 200 is represented by $R_{TW}$, the posture of the posture sensor 120 in the sensor coordinate system 210 is represented by $R_{ST}$, the relative posture of a viewpoint 220 of the user as seen from the posture sensor 120 is represented by $R_{VS}$, and the posture of the user's viewpoint 220 in the world coordinate system 200 is represented by $R_{VW}$.

R is a 4×4 matrix, and $R_{BA}$ represents the posture of an object B in a coordinate system A. In other words, R is a coordinate transformation matrix from the coordinate system A into a coordinate system B defined by the object B, and defines a transformation formula $P_B=R_{BA}P_A$ to transform coordinates $P_A=(X_A,Y_A,Z_A,1)^T$ in the coordinate system A into coordinates $P_B=(X_B, Y_B, Z_B, 1)^T$ in the coordinate system B. That is, the posture $R_{VW}$ of the user's viewpoint 220 in the world coordinate system 200 can also be represented by a coordinate transformation matrix ($P_V=R_{VW}P_W$) for transforming coordinates $P_W=(X_W,Y_W,Z_W,1)^T$ in the world coordinate system 200 into coordinates $P^v=(X_V,Y_V,Z_V,1)^T$ in a user's viewpoint coordinate system 230.

The matrix R is the product of a rotation matrix Rx defined by an angle of rotation θ around the x axis, a rotation matrix Ry defined by an angle of rotation (azimuth) φ around the y axis, and a rotation matrix Rz defined by an angle of rotation ψ around the z axis, and a relationship of R=RzRxRy holds. These matrices are expressed as follows:

$$Rx(\theta) = \begin{bmatrix} 1 & 0 & 0 & 0 \\ 0 & \cos\theta & \sin\theta & 0 \\ 0 & -\sin\theta & \cos\theta & 0 \\ 0 & 0 & 0 & 1 \end{bmatrix},$$

$$Ry(\phi) = \begin{bmatrix} \cos\phi & 0 & -\sin\phi & 0 \\ 0 & 1 & 0 & 0 \\ \sin\phi & 0 & \cos\phi & 0 \\ 0 & 0 & 0 & 1 \end{bmatrix},$$

$$Rz(\psi) = \begin{bmatrix} \cos\psi & \sin\psi & 0 & 0 \\ -\sin\psi & \cos\psi & 0 & 0 \\ 0 & 0 & 1 & 0 \\ 0 & 0 & 0 & 1 \end{bmatrix}$$

$R_{VW}$ can be expressed by $R_{VW}=R_{VS}\cdot R_{ST}\cdot R_{TW}$ - - - (equation A).

Since the y axis of the sensor coordinate system 210 is set to a direction opposite to the direction of gravity, by defining the y axis of the world coordinate system 200 to be perpendicular to the ground level, the direction of the y axis of the world coordinate system 200 can coincide with the y axis of the sensor coordinate system 210. At that time, each of components $Rx_{TW}$ and $Rz_{TW}$ around the x axis and the y axis, respectively, of $R_{TW}$ is a unit matrix, and $R_{TW}$ is equivalent to a rotation matrix $Ry_{TW}$ defined by an angle of rotation $\phi_{TW}$ around the y axis. Accordingly, the above-described (equation A) is transformed into $R_{VW}=R_{VS}\cdot R_{ST}\cdot Ry_{TW}$ (equation B).

In the above-described equations, $R_{ST}$ is an input from the posture sensor 120 to the posture-information output unit 130, $R_{VW}$ is an output from the posture-information output unit 130 to the image generation unit 150, and $R_{VS}$ and $Ry_{TW}$ (in other words, angles of rotation $\theta_{VS}$, $\phi_{VS}$ and $\psi_{VS}$ around three axes defining $R_{VS}$, and an angle of rotation $\phi_{TW}$ defining $Ry_{TW}$) constitute correction information necessary for transforming $R_{ST}$ into $R_{VW}$. The posture-information output unit 130 calculates $R_{VW}$ based on (equation B) using $R_{ST}$ input from the posture sensor 120, and $R_{VS}$ and $Ry_{TW}$ stored in the memory 140, and outputs the calculated $R_{VW}$ to the image generation unit 150.

In order to perform exact alignment between the real space and the virtual space, exact correction information must be set in the memory 140 by some means. Only when exact correction information is provided, display of the virtual image exactly aligned with the real space is realized.

In one known method for setting correction information, the user or the operator interactively increases or decreases the values of $\theta_{VS}$, $\phi_{VS}$, $\psi$ vs and $\phi_{TW}$ stored in the memory 140 via input means (not shown), and adjustment of the respective values is performed in a trial-and-error approach until exact alignment is achieved.

In this approach, since the four parameters must be simultaneously adjusted, troublesome operations are required and a large amount of time is required for adjustment.

One method for mitigating the above-described trouble has been proposed in Japanese Patent Application Laid-Open (Kokai) No. 2001-050990 (2001) filed by the assignee of the present application. This method for setting correction information will now be described.

Figure 3:
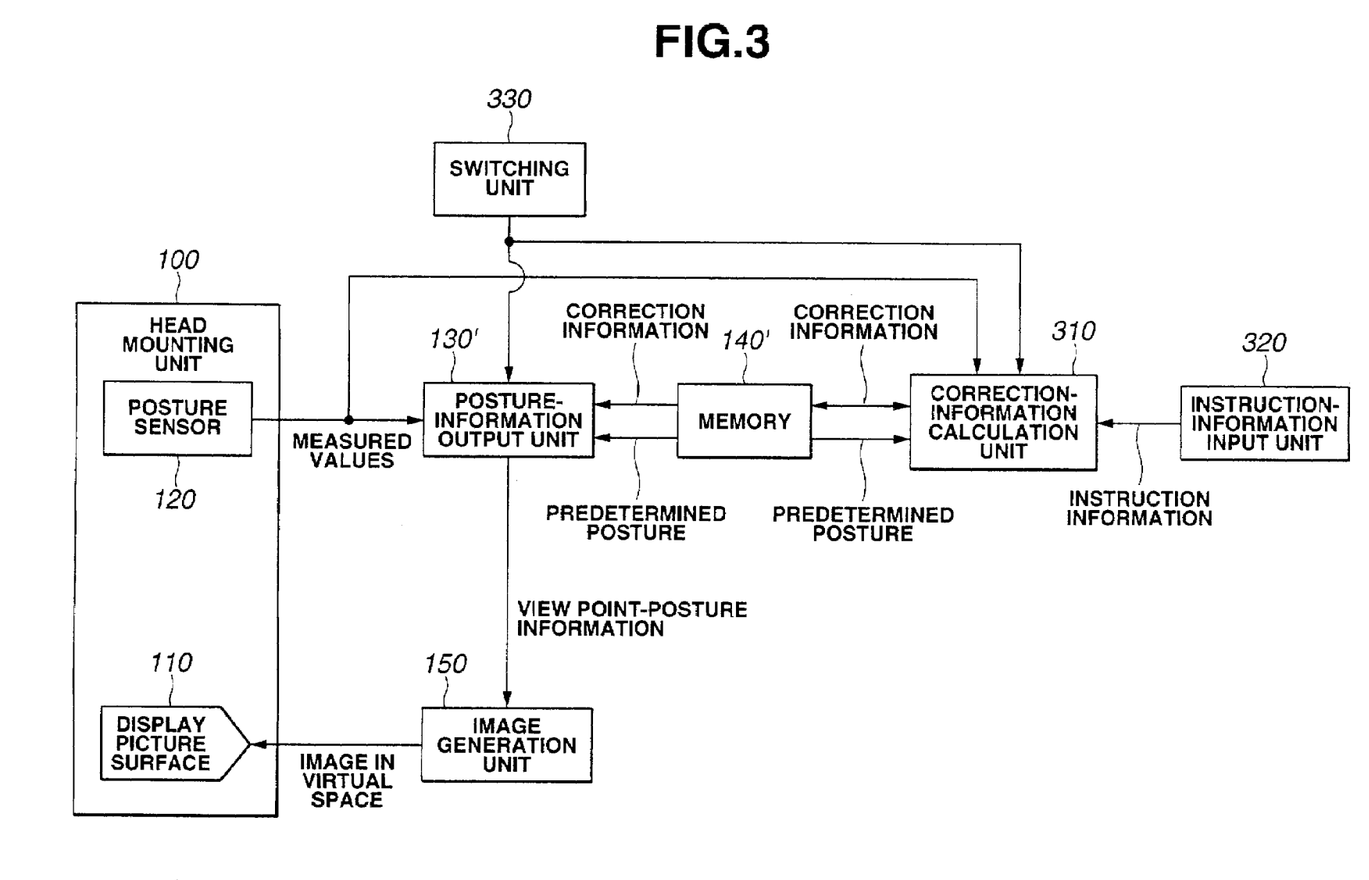
FIG. 3 is a block diagram illustrating the configuration of an image display apparatus including a correction-information calculation unit.

FIG. 3 is a block diagram illustrating the configuration of an image display apparatus in which this method for setting correction information is incorporated in the image display apparatus shown in FIG. 1. As shown in FIG. 3, in this configuration, a correction-information calculation unit 310, an instruction-information input unit 320 and a switching unit 330 are added to the configuration shown in FIG. 1. The functions of components of this image display apparatus corresponding to the posture-information output unit 130 and the memory 140 shown in FIG. 1 differ from the functions of the corresponding components shown in FIG. 1. Hence, in the image display apparatus shown in FIG. 3, these components are indicated by a posture-information output unit 130' and a memory 140'.

Correction information is calculated by moving the posture of the user's viewpoint 220 to a predetermined posture $Ry^0_{VW}$ having a visual line horizontal to the ground level in the world coordinate system, and acquiring an output $R^0_{ST}$ of the posture sensor 120 at that time. The memory 140' stores the posture $Ry^0_{VW}$ of the predetermined viewpoint (or an angle of rotation $\phi^0_{VW}$ around the y axis defining the posture), in addition to the correction information.

The switching unit 330 sets the mode of the posture-information output unit 130' to an ordinary mode or a correction-information calculation mode by receiving an input from the user or the operator (both not shown in FIG. 3).

When the mode is the ordinary mode, the posture-information output unit 130' calculates $R_{VW}$ from $R_{ST}$ input from the posture sensor 120 using correction information, as the posture-information output unit 130 described with reference to FIG. 1, and outputs the calculated $R_{VW}$ to the image generation unit 150 as posture information.

When the mode is the correction-information calculation mode, $Ry^0_{VW}$ is input from the memory 140', and is output to the image generation unit 150 as posture information. The instruction-information input unit 320 receives an input from the user or the operator, and transmits an instruction to execute correction-information calculation processing to the correction-information calculation unit 310. More specifically, in the correction-information calculation mode, the user or the operator adjusts the posture of the viewpoint 220 so that a virtual image displayed on the display picture surface 110 is correctly aligned with the real space seen via the display picture frame 110. When it is determined that they are sufficiently aligned (i.e., when it is determined that the viewpoint 220 is positioned at the posture $Ry^0{}_{VW}$), input to the instruction-information input unit 320 is performed, for example, by depressing a specific key.

The correction-information calculation unit 310 inputs an instruction to execute correction-information calculation processing from the instruction-information input unit 320, inputs the output $R^0{}_{ST}$ from the posture sensor 120 at that time (i.e., when the user or the operator determines that the viewpoint 220 is positioned at the posture $Ry^0{}_{vw}$), and calculates correction information based on the posture $Ry^0{}_{vw}$ and the posture $R^0{}_{st}$.

In the above-described method, it is necessary that a rotation component $Ry_{SV}$ (or an angle of rotation $\phi_{SV}$ around the y axis defining the rotation component) around the y axis of an inverse matrix $R_{SV}$ (representing a relative posture of the posture sensor as seen from the user's viewpoint) of the posture $R_{VS}$, serving as one component of correction information, is known by some means, and is already stored in the memory 140'.

At that time, a relationship of $Ry^0{}_{VW} = R^0{}_{VS} \cdot R^0{}_{ST} \cdot Ry_{TW}$ (equation C) holds between data processed at the correction-information calculation unit 310, according to (equation B). By modifying (equation C), the following equation is obtained:

$$Ry^0{}_{VW} = (Rz_{SV} Rx_{SV} Ry_{SV})^{-1} R^0{}_{st} Ry_{TW} \quad \text{(equation D)}.$$

The correction-information calculation unit 310 inputs $Ry^0{}_{VW}$ and $Ry_{SV}$ from the memory 140' and $R^0{}_{ST}$ from the sensor 120, and calculates unknown components $Rz_{SV}$, $Rx_{SV}$ and $Ry_{TW}$ of correction information based on (equation D), according to the following procedure.

By further modifying (equation D), the following equation is obtained:

$$Rz_{SV} Rx_{SV} Ry_{SV} Ry^0{}_{VW} = Rz^0{}_{ST} Rx^0{}_{ST} Ry^0{}_{ST} Ry_{TW} \quad \text{(equation E)}.$$

Since each of the left and right sides of (equation E) is the product of rotation components around the z, x and y axes, an identity holds for each rotation component around each of the z, x and y axes.

First, an identity of a rotation component around each of the z and x axes is as follows. That is, $$Rz_{SV} = Rz^0{}_{ST} \quad \text{(equation F)}$$

$$Rx_{SV} = Rx^0{}_{ST} \quad \text{(equation G)}.$$

Thus, it is possible to obtain $Rz_{SV}$ and $Rx_{SV}$.

An identity of a rotation component around the y axis is as follows. That is, $$Ry_{SV} Ry^0{}_{VW} = Ry^0{}_{ST} Ry_{TW}.$$

From this equation, the following equation is obtained:

$$Ry_{TW} = Ry_{SV} Ry^0{}_{VW} Ry^0{}_{ST}{}^{-1} \quad \text{(equation H)}.$$

Thus, it is possible to obtain $Ry_{TW}$.

The correction-information calculation unit 310 calculates $Rz_{SV}$, $Rx_{SV}$ and $Ry_{TW}$ according to the above-described processing, further calculates $R_{VS}$ ($= (Rz_{SV} Rx_{SV} Ry_{SV})^{-1}$) from these values, and outputs $R_{VS}$ and $Ry_{TW}$ (or angles of rotation $\theta_{SV}$, $\phi_{SV}$ and $\phi_{TW}$ defining these values) to the memory 140'.

$Ry_{SV}$ may be obtained from measured values by a protractor or the like in a trial-and-error approach, or by using any other appropriate measuring means.

As described above, by obtaining only $Ry_{SV}$ in correction information, it is possible to easily obtain other unknown components of correction information, and realize exact alignment.

However, it is generally difficult to exactly measure correction information $Ry_{SV}$ in advance. Accordingly, it is actually necessary to repeat a series of operations of rough setting of $Ry_{SV}$, processing to obtain other components of correction information, fine adjustment of $Ry_{SV}$, processing to obtain other components of correction information, fine adjustment of $Ry_{SV}$, . . . until exact alignment is realized, and therefore troublesome operations and a large amount of time are required for acquiring correction information.

SUMMARY OF THE INVENTION

The present invention has been made in consideration of the above-described problems.

It is an object of the present invention to more simply acquire correction information for transforming measured values of a sensor into the posture of a viewpoint in the world coordinate system.

According to one aspect of the present invention, an image display apparatus for displaying a virtual image in accordance with a posture of a viewpoint of a user observing a display picture surface on the display picture surface includes a posture sensor that outputs measured values of the posture, first display means for generating the virtual image based on predetermined posture information stored in a memory in advance, and displaying the generated virtual image on the display picture surface, calculation means for calculating correction information based on the measured values of the posture from the posture sensor and the predetermined posture information, when it is notified that the posture of the viewpoint and a posture indicated by the predetermined posture information coincide, second display means for generating the virtual image based on posture information relating to the viewpoint obtained using the measured values of the posture obtained from the posture sensor and the correction information, and displaying the generated virtual image on the display picture surface, and modification means for modifying the correction information in response to a predetermined operation, while displaying the virtual image by the second display means.

According to another aspect of the present invention, an image display method for displaying an image in a virtual space in accordance with a posture of a viewpoint of a user observing a display picture surface on the display picture surface, while optically transmitting a real space on the display picture surface includes a switching step of performing switching between a first mode and a second mode, a posture-information output step of calculating the posture of the viewpoint based on correction information and measured values of the posture having three degrees of freedom input from a posture sensor and outputting the calculated posture as posture information, in the first mode, and outputting a predetermined posture as posture information relating to the viewpoint, in the second mode, an image generation step of generating the image based on the posture information output in the posture-information output step, an instruction-information input step of inputting instruction information instructing that the posture of the viewpoint coincides with the predetermined posture, a correction-information calculation step of calculating the correction information based on the measured values of the posture when and/or before and after the instruction information has been input, and the predetermined posture, a modification information input step of inputting modification information for modifying the correction information, and a correction-information modification step of modifying the correction information in accordance with the modification information.

According to still another aspect of the present invention, an image display method for generating a superposed image obtained by superposing an image in a virtual space in accordance with a posture of a viewpoint of an image pickup apparatus on a real image photographed by the image pickup apparatus, and displaying the generated superposed image on a display picture surface includes a switching step of performing switching between a first mode and a second mode, a posture-information output step of calculating the posture of the viewpoint based on correction information and measured values of the posture having three degrees of freedom input from a posture sensor and outputting the calculated posture as posture information, in the first mode, and outputting a predetermined posture as posture information relating to the viewpoint, in the second mode, an image generation step of generating the superposed image based on the posture information output in the posture-information output step, an instruction-information input step of inputting instruction information instructing that the posture of the viewpoint coincides with the predetermined posture, a correction-information calculation step of calculating the correction information based on the measured values of the posture when and/or before and after the instruction information has been input, and the predetermined posture, a modification information input step of inputting modification information for modifying the correction information, and a correction-information modification step of modifying the correction information in accordance with the modification information.

According to yet another aspect of the present invention, a computer readable storage medium stores program codes for causing a computer to execute one of the above-described image display methods.

According to a further aspect of the present invention, a control program causes a computer to execute one of the above-described image display methods.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

A preferred embodiment of the present invention will now be described in detail with reference to the drawings.

In the following embodiment, a description will be provided of a case in which an image display apparatus and method of the present invention is applied to a simulation apparatus and method for performing scenery simulation of a building to be built.

Figure 4:
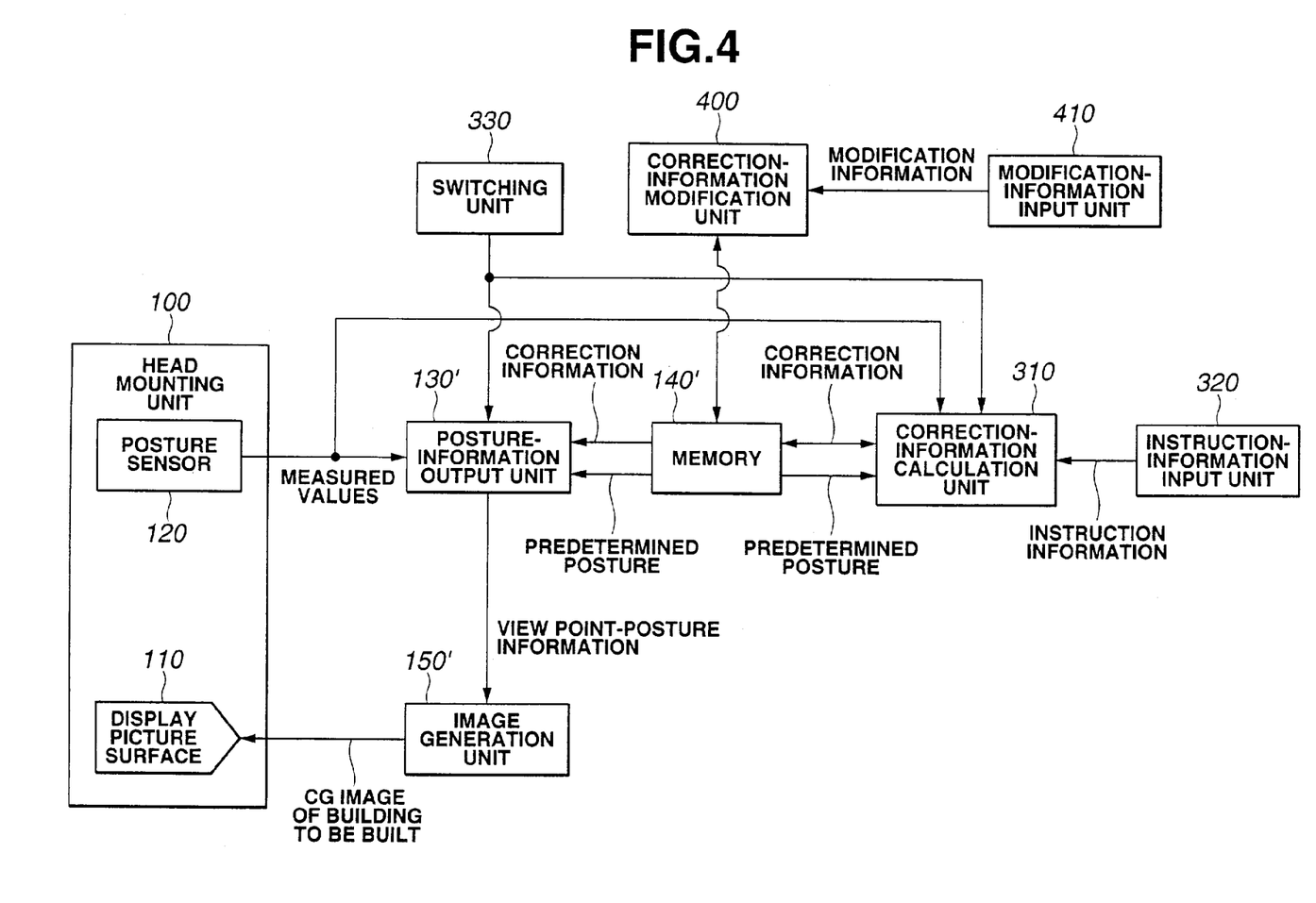
FIG. 4 is a block diagram illustrating the configuration of an image display apparatus according to an embodiment of the present invention.

FIG. 4 illustrates the configuration of a simulation apparatus according to the embodiment. As shown in FIG. 4, in the configuration of the apparatus of the embodiment, a correction-information modification unit 400 and a correction-information input unit 410 are added to the configuration of the image display apparatus shown in FIG. 3. It is assumed that an image generation unit 150' has the function of generating a CG image of a building to be built, as a virtual image. A head mounting unit 100, a display picture surface 110, a posture sensor 120, a posture-information output unit 130', a memory 140', a correction-information calculation unit 310, an instruction-information input unit 320 and a switching unit 330 operate in the same manner as corresponding ones of the image display apparatus shown in FIG. 3. Hence, further description thereof will be omitted.

In this embodiment, correction information $\phi_{SV}$ stored in the memory 140' in advance need not have an exact value. An outline of processing to acquire correction information in this embodiment is as follows:

(1) First, components $R_{VS}$ and $Ry_{TW}$ (or angles of rotation $\theta_{SV}$, $\phi_{SV}$ and $\phi_{TW}$ defining these values) of correction information are calculated based on roughly set correction information $\phi_{SV}$, according to the correction-information calculation method described with reference to FIGS. 2 and 3. (2) Then, fine adjustment of $Ry_{SV}$ and $Ry_{TW}$ (or angles of rotation $\phi_{SV}$ and $\phi_{TW}$ defining these values), that are components of indeterminate correction information, is performed according to the following method.

Fine adjustment of the angles of rotation $\phi_{SV}$ and $\phi_{TW}$ will now be described. The modification-information input unit 410 outputs a command to increase the value of the correction information $\phi_{SV}$ by a constant value (an increase command), or a command to decrease the value of the correction information $\phi_{SV}$ by a constant value (a decrease command) to the correction-information modification unit 400, in response to an input from a user or an operator (both not shown).

The correction-information modification unit 400 inputs the values of the correction information $\phi_{SV}$ and $\phi_{TW}$ from the memory 140', performs the following modification to the correction information in accordance with the increase/decrease command transmitted from the modification-information input unit 410, and outputs the result of modification to the memory 140'.

That is, when the increase command has been input, the values of $\phi_{SV}$ and $\phi_{TW}$ are increased by a constant value $\Delta\phi$.

$$\phi_{SV} \leftarrow \phi_{SV} + \Delta\phi$$

$$\phi_{TW} \leftarrow \phi_{TW} + \Delta\phi \quad \text{(equation I)}.$$

Similarly, when the decrease command has been input, the values of $\phi_{SV}$ and $\phi_{TW}$ are decreased by the constant value $\Delta\phi$.

$$\phi_{SV} \leftarrow \phi_{SV} - \Delta\phi$$

$$\phi_{TW} \leftarrow \phi_{TW} - \Delta\phi \quad \text{(equation J)}.$$

The reason why the values of the correction information $\phi_{SV}$ and $\phi_{TW}$ are operated by the same amount is that the following relationship holds between these values from (equation H):

$$\phi_{TW} = \phi_{SV} + \phi^0_{VW} - \phi^0_{ST} \quad \text{(equation K)}.$$

Figure 5:
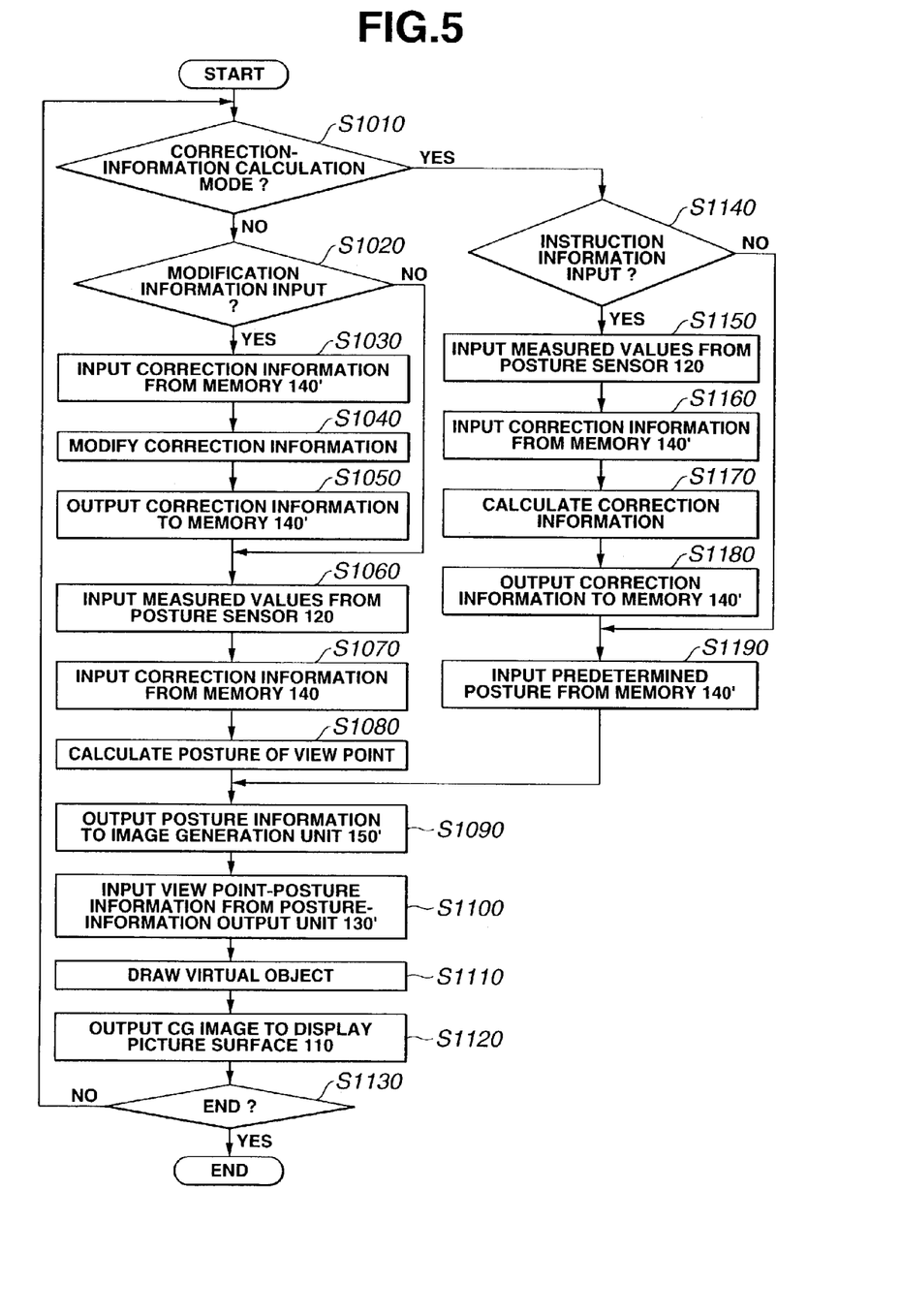
FIG. 5 is a flowchart illustrating control in the image display apparatus shown in FIG. 4.

FIG. 5 is a flowchart illustrating the processing procedure of the image display apparatus of the embodiment. Program codes for the flowchart shown in FIG. 5 are stored within a memory (not shown), such as a RAM (random access memory), a ROM (read-only memory) or the like, within the image display apparatus, and are read and executed by a CPU (central processing unit) (not shown).

First, in step S1010, it is determined whether or not the current mode is a correction-information calculation mode. Switching of a mode is performed by the switching unit 330. For example, the switching unit 330 determines which of a correction-information calculation mode and an ordinary mode has been instructed by detecting a predetermined key operation, and notifies the posture-information output unit 130' and the correction-information calculation unit 310 of the result of the determination.

When the mode is the correction-information calculation mode, the process proceeds to step S1140, where the correction-information calculation unit 310 determines whether or not instruction information has been input from the instruction-information input unit 320. If the result of the determination in step S1140 is negative, the correction-information calculation unit 310 does not execute processing indicated by steps S1150–S1180, and the process skips to step S1190, where the posture-information output unit 130' inputs predetermined posture information from the memory 140'. Then, in step S1090, the input posture information is output to the image generation unit 150' as the posture information relating to the viewpoint.

In step S1100, the image generation unit 150' inputs the posture information of the viewpoint from the posture-information output unit 130', and sets this information as drawing parameters for a virtual object. Then, in step S1110, a virtual image is drawn using the set drawing parameters to generate a CG image. Then, in step S1120, the generated CG image is output to the display picture surface 110. Thus, the virtual image corresponding to a predetermined posture is displayed on the display picture surface 110. This processing is repeated during the correction-information calculation mode.

The user or the operator adjusts the posture of the head so that the virtual image displayed on the display picture surface 110 is correctly aligned with the real space (real world). Upon completion of the adjustment, input of instruction information is performed by the instruction-information input unit 320. For example, the instruction-information input unit 320 detects a predetermined key operation by the user, and notifies the correction-information calculation unit 310 of the fact.

If the result of the determination in step S1140 is affirmative, the process proceeds to step S1150, where the correction-information calculation unit 310 inputs measured values from the posture sensor 120. Then, in step S1160, a predetermined posture and correction information $Ry_{SV}$ (or an angle of rotation $\phi_{SV}$ defining this value) are input from the memory 140'. Then, in step S1170, unknown correction information is calculated in accordance with the above-described (equation F), (equation G) and (equation H). Then, in step S1180, the calculated correction information is output to the memory 140'.

Thereafter, the switching unit 330 sets the ordinary mode, and fine adjustment of $Ry_{SV}$ and $Ry_{TW}$ (or angles of rotation $\phi_{SV}$ and $\phi_{TW}$ defining these values), that are indeterminate components of correction information, is performed. The ordinary mode in which such fine adjustment can be performed will now be described.

When the mode has been set to the ordinary mode by the switching unit 330, the process proceeds from step S1010 to step S1020. In step S1020, it is determined whether or not modification information has been input from the modification-information input unit 410.

If the result of the determination in step S1020 is negative, the process proceeds to step S1060, where the posture-information output unit 130' inputs measured values from the posture sensor 120. Then, in step S1070, correction information is input from the memory 140'. Then, in step S1080, the posture-information output unit 130' calculates the posture of the viewpoint based on the input measured values and correction information in accordance with the above-described (equation F). Then, in step S1090, the calculated posture is output to the image generation unit 150' as the posture information relating to the viewpoint.

The image generation unit 150' inputs, in step S1100, the posture information of the viewpoint from the posture-information output unit 130', generates, in step S1110, a CG image by drawing a virtual object based on the posture information, and outputs, in step S1120, the generated CG image to the display picture surface 110. Thus, the virtual image corresponding to the posture of the viewpoint is displayed on the display picture surface 110. This processing is repeated during the ordinary mode.

The user or the operator confirms whether or not the virtual image displayed on the display picture surface 110 is correctly aligned with the real space, when the posture of the head has been changed. If misalignment is produced due to a change in the posture, fine adjustment of correction information is performed by inputting modification information from the modification-information input unit 410.

When the modification information has been input, the correction-information modification unit 400 executes the following steps S1030–S1050.

First, in step S1030, components $Ry_{SV}$ and $Ry_{TW7590}$ (or angles of rotation $\phi_{SV}$ and $\phi_{TW}$ defining these values) of correction information are input from the memory 140'. Then, in step S1040, modification of the correction information is performed in accordance with the above-described (equation I) and (equation J). Then, in step S1050, the modified correction information is output to the memory 140'. Since the modified correction information is immediately reflected on calculation of the posture by the posture-information calculation unit 130', the user or the operator can interactively input modification information while watching the result of fusion of the image in the real space and the image in the virtual space. Accordingly, fine adjustment of correction information can be easily performed so that correct alignment is realized. Although in this embodiment, modification information is a command to increase or decrease the value by a predetermined amount, the amount of increase or decrease may be instructed.

The posture-information output unit 130', the memory 140', the image generation unit 150', the correction-information calculation unit 310, the instruction-information input unit 320, the switching unit 330, the correction-information modification unit 400 and the modification-information input unit 410 may, for example, be configured by a single general-purpose computer (such as a notebook-type personal computer or the like). Although in this embodiment, the posture sensor TISS-5-40 made by Tokimec Kabushiki Kaisha is illustrated as the posture sensor 120, any other posture sensor may, of course, be used.

It is desirable to perform an input operation from the switching unit 330, the instruction-information input unit 320 or the modification-information input unit 410 via the same user interface using, for example, a keyboard or a control pad.

Although in the above-described embodiment, MR according to the optical see-through method is realized, the present invention is not limited to the optical see-through method, but may also be applied to MR according to the video see-through method. In that case, instead of the posture of the user s viewpoint 220 in the above-described embodiment, a viewpoint of an image pickup apparatus (for example, a video camera) is to be measured. In the video see-through method, the image generation unit 150' draws a CG image in a state of being superposed on an image in a real space photographed by the image pickup apparatus, and displays the resultant image on the display image surface 110.

As described above, according to the foregoing embodiment, it is possible to easily acquire correction information for transforming a posture of a sensor in the sensor coordinate system into a posture to be measured in the world coordinate system.

MODIFICATION EXAMPLE 1

Although in the above-described embodiment, a CG image of a virtual object to be displayed is used in order to perform alignment, any geographic information may be used provided that it serves as a visual cue for confirming that alignment between a virtual space and a real space is performed. For example, alignment may be performed by performing modeling of topography or the shape of a real building, and drawing a wire-frame model of the shape at the same position in the real space in a superposed state. It is, of course, also possible to perform display by combining a wire-frame model of a real object and a virtual object to be displayed.

MODIFICATION EXAMPLE 2

Although in the above-described embodiment, the image display apparatus and method of the invention is applied to scenery simulation, the present invention may, of course, also be applied to any other appropriate MR system than scenery simulation. The present invention is not limited to a MR system, but may also be applied to various uses in which the position/posture of a viewpoint is measured using a posture sensor.

MODIFICATION EXAMPLE 3

Although in the above-described embodiment, the posture sensor TISS-5-40 made by Tokimec Kabushiki Kaisha is used as the posture sensor, the posture sensor is not limited to this sensor. The present invention may be applied to any other posture sensor provided that one axis of the sensor coordinate system is set by being correlated with the world coordinate sensor.

MODIFICATION EXAMPLE 4

In the above-described embodiment, the correction-information calculation unit 310 inputs an output from the posture sensor 120 when instruction information has been input, as $R^0_{ST}$, and this is used for calculation of correction information (step S1170). However, an output from the posture sensor 120 when instruction information has been input is not necessarily used as $R^0_{ST}$. For example, measured values (for example, the mean value of these values) from the posture sensor 120 before and after instruction information has been input may also be used. Alternatively, the viewpoint 220 may be brought to a standstill at the posture $Ry^0_{VW}$ for a constant time period, and $R^0_{ST}$ may be obtained based on the mean value of the output values from the posture sensor 120 during that time period. Furthermore, if it is possible to acquire an output from the posture sensor 120 when the viewpoint 220 is positioned at the posture $Ry^0_{VW}$, $R^0_{st}$ may be acquired according to any appropriate method.

OTHER EMBODIMENT

The object of the present invention may, of course, also be achieved by supplying a system or an apparatus with a storage medium (or a recording medium) storing program codes of software for realizing the functions of the above-described embodiments, and reading and executing the program codes stored in the storage medium by means of a computer (or a CPU or an MPU (microprocessor unit)) of the system or the apparatus. In such a case, the program codes themselves read from the storage medium realize the functions of the above-described embodiments, so that the storage medium storing the program codes constitute the present invention. The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing, and the functions of the above-described embodiments are realized by the processing When applying the present invention to the storage medium, program codes corresponding to the above-described flowchart (shown in FIG. 5) are stored in the storage medium.

The individual components shown in outline or designated by blocks in the drawings are all well known in the image display apparatus and method arts and their specific construction and operation are not critical to the operation or the best mode for carrying out the invention.

While the present invention has been described with reference to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display apparatus for calculating correction information to correct measured values of an orientation sensor, said apparatus comprising:

an orientation sensor that senses orientation of a viewpoint and outputs measured values of the orientation;

a correction unit that corrects the measured values by using correction information;

a generation unit that generates a virtual image based on the corrected measured values;

a display unit that displays the generated virtual image; and a calculation unit that calculates the correction information, wherein said calculation unit obtains the measured values of said sensor at the point of when the virtual image, which is generated based on predetermined orientation information, is displayed in an appropriate position, generates the correction information from the measured values and the predetermined orientation information, obtains a user's instruction to modify the correction information, according to the displayed virtual image which is generated based on the measured values of the orientation sensor and the correction information, and modifies the generated correction information in response to the user's instruction, wherein said calculation unit modifies the generated correction information to maintain a relationship between a first angle of rotation and a second angle of rotation according to the generated correction information, with the first angle relating to an azimuth at an orientation of said sensor in a vision coordinate system, and the second angle relating to an azimuth at an orientation of a sensor coordinate system in a world coordinate system and wherein, said display unit displays the image with the modified generated correction information.

2. An image display apparatus according to claim 1, wherein said display unit is an optical see-through-type through which a real space is transparently observable with the virtual image.

3. An image display apparatus according to claim 1, wherein said image display unit displays an image which is generated by superposing the virtual image on a real image photographed by an image pickup apparatus on said display picture surface.

4. An image display apparatus according to claim 1, wherein the output values from said orientation sensor constitute information representing an orientation of said orientation sensor in a sensor coordinate system, wherein the correction information includes first coordinate transformation information for transforming the orientation of said orientation sensor into the orientation of the viewpoint, and second coordinate transformation information for transforming the orientation in the sensor coordinate system into an orientation in a world coordinate system, and wherein said calculation unit simultaneously modifies transformation information relating to an azimuth within the first coordinate transformation information and transformation information relating to an azimuth within the second coordinate transformation information.

5. An information processing method for generating correction information for correcting a measured value of an orientation sensor, wherein the measured value is used for generating a virtual image in response to a view orientation of a user, said method comprising the steps of:

inputting the user's instruction to indicate that a virtual image, which is generated based on predetermined orientation information, is displayed in an appropriate position;

obtaining measured values based on the user's instruction;

generating the correction information from the measured values and the predetermined orientation;

obtaining a user's instruction to modify the correction information, according to the displayed virtual image which is generated based on the measured values of the orientation sensor and the correction information, modifying the generated correction information in response to the user's instruction, and modifying the generated correction information to maintain a relationship between a first angle of rotation and a second angle of rotation according to the generated correction information, with the first angle relating to an azimuth at an orientation of the sensor in a vision coordinate system, and the second angle relating to an azimuth at an orientation of a sensor coordinate system in a world coordinate system, and displaying the image with the modified generated correction information.

6. An information processing method according to claim 5, wherein the measured values represent an orientation of the orientation sensor in a sensor coordinate system, wherein the correction information includes first coordinate transformation information for transforming the orientation of the orientation sensor into the orientation of the viewpoint, and second coordinate transformation information for transforming the orientation in the sensor coordinate system into an orientation in a predetermined coordinate system, and wherein said modifying step simultaneously modifies transformation information relating to an azimuth of the first coordinate transformation information and transformation information relating an azimuth of the second coordinate transformation information.

7. A computer readable storage medium that stores program codes for causing a computer to execute an image display method according to claim 5.

8. An information processing method for generating correction information for correcting a measured value of an orientation sensor, wherein the measured value is used for generating a virtual image in response to a view orientation of a user, said method comprising the steps of:

inputting the user's instruction to indicate that a virtual image, which is generated based on predetermined orientation information, is displayed in an appropriate position;

obtaining measured values based on the user's instruction;

generating the correction information from the measured values and the predetermined orientation;

generating the virtual image based on orientation information relating to the viewpoint obtained using the measured values of the orientation sensor and the correction information;

displaying the generated virtual image; and modifying the correction information in response to the user's instruction, while displaying the virtual image, wherein a first angle of rotation around a Y axis at an orientation of the sensor in a vision coordinate system, and a second angle of rotation around the Y axis at an orientation of a sensor coordinate system in a world coordinate system of the correction information are modified, and wherein, the first angle of rotation and the second angle of rotation maintain a predetermined relationship.

* * * * *

UNITED STATES PATENT AND TRADEMARK OFFICE
CERTIFICATE OF CORRECTION

PATENT NO. : 7,095,424 B2
APPLICATION NO. : 10/274200
DATED : August 22, 2006
INVENTOR(S) : Kiyohide Satoh et al.

It is certified that error appears in the above-identified patent and that said Letters Patent is hereby corrected as shown below:

COLUMN 10:

Line 36, "$Ry_{TW7590}$" should read --$Ry_{TW}$--.

COLUMN 12:

Line 10, "$R^0_{st}$" should read --$R^0_{ST}$--.
Line 13, "EMBODIMENT" should --EMBODIMENTS--.

Signed and Sealed this

Fourth Day of March, 2008

JON W. DUDAS
*Director of the United States Patent and Trademark Office*